(12) United States Patent
Dubief et al.

(10) Patent No.: US 11,523,710 B2
(45) Date of Patent: Dec. 13, 2022

(54) COFFEE CONTAINERS AND ASSOCIATED SYSTEM AND METHOD FOR PREPARING ROAST AND GROUND COFFEE

(71) Applicant: NESTEC S.A., Vevey (CH)

(72) Inventors: Flavien Dubief, Champagne (CH);
Alexandre Perentes, Sullens (CH);
Alfred Yoakim, St-Legier-la-Chiesaz (CH); Christianne Bournival, Orbe (CH)

(73) Assignee: Societe des Produits Nestle S.A., Vevey (CH)

( * ) Notice: Subject to any disclaimer, the term of this patent is extended or adjusted under 35 U.S.C. 154(b) by 923 days.

(21) Appl. No.: 16/339,450

(22) PCT Filed: Oct. 6, 2017

(86) PCT No.: PCT/EP2017/075498
§ 371 (c)(1),
(2) Date: Apr. 4, 2019

(87) PCT Pub. No.: WO2018/069182
PCT Pub. Date: Apr. 19, 2018

(65) Prior Publication Data
US 2019/0231146 A1 Aug. 1, 2019

(30) Foreign Application Priority Data

Oct. 14, 2016 (EP) ..................................... 16194012

(51) Int. Cl.
*A47J 42/52* (2006.01)
(52) U.S. Cl.
CPC ..................... *A47J 42/52* (2013.01)

(58) Field of Classification Search
CPC .................................. A47J 42/52; A23N 12/08
See application file for complete search history.

(56) References Cited

U.S. PATENT DOCUMENTS 3,153,377 A * 10/1964 Bosak ..................... A47J 31/42
99/290
4,096,640 A * 6/1978 Krambrock ............... B01J 8/12
34/369

(Continued)

FOREIGN PATENT DOCUMENTS

| CH | 314304 | 6/1956 |
| DE | 444160 | 5/1927 |

(Continued)

OTHER PUBLICATIONS

Chinese Office Action for Appl No. 201780058894.1 dated Sep. 2, 2021.

*Primary Examiner* — Faye Francis
(74) *Attorney, Agent, or Firm* — K&L Gates LLP

(57) ABSTRACT

A coffee bean container configured to store green and/or partially roasted coffee beans includes an inner volume where the beans are stored, roasting means allowing beans to roast at a certain required degree depending on the original roasting level of the stored beans, and at least part of a grinder to allow for grinding of the beans, once roasted, to a certain grinding size. The roasting means may be a roasting hollow tube through which pressurized hot air circulates such that coffee beans circulate inside the tube and within the internal volume, creating a fountain effect.

25 Claims, 11 Drawing Sheets

(56) References Cited

U.S. PATENT DOCUMENTS

| | | | |
|---|---|---|---|
| 4,484,064 A | | 11/1984 | Murray |
| 4,569,596 A | * | 2/1986 | Romanchik ....... B01F 33/40511 366/107 |
| 4,631,838 A | * | 12/1986 | Eichler .................. A23N 12/08 34/79 |
| 5,307,733 A | | 5/1994 | Enomoto |
| 5,500,237 A | * | 3/1996 | Gell, Jr. ............... A23N 12/083 34/594 |
| 6,065,226 A | * | 5/2000 | Gell, Jr. ............... B01D 39/163 34/594 |
| 11,259,557 B2 | * | 3/2022 | Perentes .................... A23F 5/04 |
| 2003/0207010 A1 | * | 11/2003 | Moon .................... A23N 12/08 426/466 |
| 2010/0043645 A1 | | 2/2010 | Suggi Liverani et al. |
| 2011/0081467 A1 | | 4/2011 | Kando et al. |
| 2011/0185908 A1 | | 8/2011 | Berto |
| 2012/0070546 A1 | | 3/2012 | Tanja et al. |
| 2013/0180406 A1 | | 7/2013 | Hay et al. |
| 2016/0066742 A1 | | 3/2016 | de Graaff |
| 2020/0107672 A1 | * | 4/2020 | Cha ......................... A47J 31/42 |

FOREIGN PATENT DOCUMENTS

| | | |
|---|---|---|
| DE | 827233 | 1/1952 |
| FR | 915026 | 10/1946 |
| GB | 2485073 | 5/2012 |
| JP | 04126111 | 4/1992 |
| JP | 2006204737 | 8/2006 |
| WO | 2011117663 | 9/2011 |

\* cited by examiner

COFFEE CONTAINERS AND ASSOCIATED SYSTEM AND METHOD FOR PREPARING ROAST AND GROUND COFFEE

CROSS REFERENCE TO RELATED APPLICATIONS

The present application is a National Stage of International Application No. PCT/EP2017/075498, filed on Oct. 6, 2017, which claims priority to European Patent Application No. 16194012.7, filed on Oct. 14, 2016, the entire contents of which are being incorporated herein by reference.

FIELD OF THE INVENTION

The present invention relates to coffee bean containers used for storing and preserving coffee beans, the containers being further used to roast and grind these beans in order to deliver roast and ground coffee on demand. The invention further relates to a system and to a method operating with said containers.

BACKGROUND OF THE INVENTION

When making coffee, present consumers demand more and more the use of coffee beans that have been freshly roasted and possibly also freshly grinded. Currently available home roasters and home grinders usually pre-set the parameters of the roasting and of the grinding process, therefore adjusting roasting and/or grinding parameters is not a possibility offered to consumers. When this possibility is offered, it happens that the preparation time of the roast and ground coffee, when a good blend is prepared, is too long and also the consumer, when adjusting the parameters for the roasting and grinding, does not set correct parameters, resulting in a low quality final blend, not satisfactory.

For example, document GB 860894 is known in the state of the art, disclosing a method and a machine for automatically producing coffee extract from green coffee beans, roasting individual rations of coffee beans which are later grinded, such that the ground coffee is extracted for producing individual small rations or cups of a coffee extract from each individual ration of coffee beans. In this document, the roasting, grinding and extracting operations are individually and successively executed for each ration of coffee. However, this system does not allow producing different blends of coffee by mixing different coffee types for example, neither discloses a full automated system allowing to produce said different blends on demand.

Another example in the prior art comes from document U.S. Pat. No. 5,267,507, disclosing a coffee maker capable of providing freshly brewed coffee from raw coffee beans through a process of roasting, grinding, and brewing the coffee. This coffee maker includes a roaster which roasts raw coffee beans, cooling means for cooling the coffee beans roasted by the roaster, grinding means for grinding the beans and supplying the ground coffee, and heating and water supply means which heats and supplies the water from a water tank. However, this system does not allow producing different blends of coffee by mixing different coffee types, neither discloses a full automated system allowing to produce said different blends on demand.

Further, prior art document WO 2010033023 discloses a system for preparing a coffee beverage including a coffee making apparatus comprising a grinder for grinding coffee beans to obtain ground coffee, a coffee beverage preparation device arranged for, with supply of water to the ground coffee, preparing the coffee beverage, and a coffee outlet for dispensing the coffee beverage. However, such a system does not disclose any roasting unit or device able to provide roasting of the coffee beans which need to be provided already roasted.

Another example in the state of the art comes from document U.S. Pat. No. 5,564,331, disclosing an apparatus for roasting raw coffee beans by means of a heated airstream for a predetermined period of time, and then to apply a cooling airstream at the end of the roasting process. However, such a system does not disclose any grinding unit nor does it present a complete system able to prepare and provide different coffee blends on demand.

The problem of these known systems is that they are complex and voluminous; furthermore, these systems are not flexible in terms of adjustment of roasting and/or grinding parameters and do not always provide consistent and repeatable results. Therefore, the aim of the present invention is to provide a system able to deliver roast and ground coffee on demand departing from coffee beans, in an automatic, easy and convenient way, solving the drawbacks in the state of the art. The present invention is oriented towards these needs.

SUMMARY OF THE INVENTION

According to a first aspect, the invention relates to a coffee bean container 10, 10' comprising green and/or partially roasted coffee beans, the container comprising: an inner volume 14 where beans are stored; roasting means allowing beans roasting in a certain required degree depending on the original roasting level of the stored beans; at least part or complete grinding means allowing grinding of the beans, once roasted, to a certain grinding size.

Preferably, the roasting means comprise a roasting hollow tube 11 through which hot air at pressure circulates such that coffee beans circulate within the internal container volume and inside the tube 11, creating a fountain effect. The tube 11 typically further comprises holes through which air goes into the inner container volume 14. In the container of the invention, the inner volume 14 is at least twice or three times the initial volume occupied by the beans.

Typically, the roasting means further introduce an ambient or refrigerating cooling media to cool down the roasted beans. The container of the invention further comprises a lid 12 closing the upper part of the cartridge and provided with a filter. Preferably, the container further comprises a sloped area 130 separated from the entrance to the roasting means by adjustable means defining the flow of beans into the roasting means.

The coffee bean container of the invention typically further comprises a grill 132 that can be removed to allow the beans enter the grinding means. The container of the invention is preferably made in metal (aluminium or stainless steel) and/or glass and/or plastic (Teflon, PET, glass-reinforced high temperature polymers) and/or carton and/or fabric or tissue.

Moreover, the coffee bean container of the invention further comprises an external envelope 15 preserving and protecting the container from UV light and shocks.

The coffee bean container of the invention further typically comprises identification means with information on the type of coffee beans and/or on the quantity of coffee beans and/or on the roasting process to apply and/or on the roasting level of the beans and/or on the preferred grinding size.

According to a second aspect, the invention relates to a device 20 operating with a coffee bean container as described comprising air means injecting air at temperature comprised between 180° C. and 240° C. at a pressure of about 1 bar.

In the device of the invention, the roasting and grinding parameters applied, such as temperature, time, pressure, flow, grinding size, are preferably given by identification means on the container.

In the device according to the invention, the air is typically injected in the volume 14 of the container with a vortex and/or spiral and/or helicoidal movement, being also possible that it further comprises mechanical means able to provide movement to the container so that air and beans are uniformly roasted.

The device of the invention preferably further comprises means injecting an ambient or refrigerating cooling media inside the inner volume 14 of the container after the roasting process.

The device of the invention typically comprises a motor to action the grinding means and possibly also part of grinding means connecting to the part of the grinding means in the container and typically further comprises reading means to read the information on identification means in the container to apply roasting and/or grinding parameters.

According to a third aspect, the invention relates to a system 100 for preparing roast and ground coffee comprising at least one coffee bean container as described and at least a device as previously described.

According to yet a fourth aspect, the invention relates to a method for preparing roast and ground coffee on-demand departing from coffee beans in a coffee bean container as described and using a device according as previously described, the method comprising the following steps:

connecting a coffee bean container to a preparation device;

injecting hot air at pressure into the volume of the container making circulation of the coffee beans for an homogeneous roasting according to the roasting parameters read from identification means in the container;

after roasting, ambient or refrigerating cooling media is injected in the inner volume of the container to cool the beans;

after the beans are cooled down, the communication to the grinder is opened;

setting the grinder to the specific grinding size read from identification means in the container;

activating the grinder on demand to deliver roast and ground coffee.

Preferably, in the method for preparing roast and ground coffee on-demand of the invention the grinding size is defined by mechanical means adjusting the distance between the container and the grinding means or is given directly by the geometrically defined offset in the grinding means.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figures 1A, 1B:
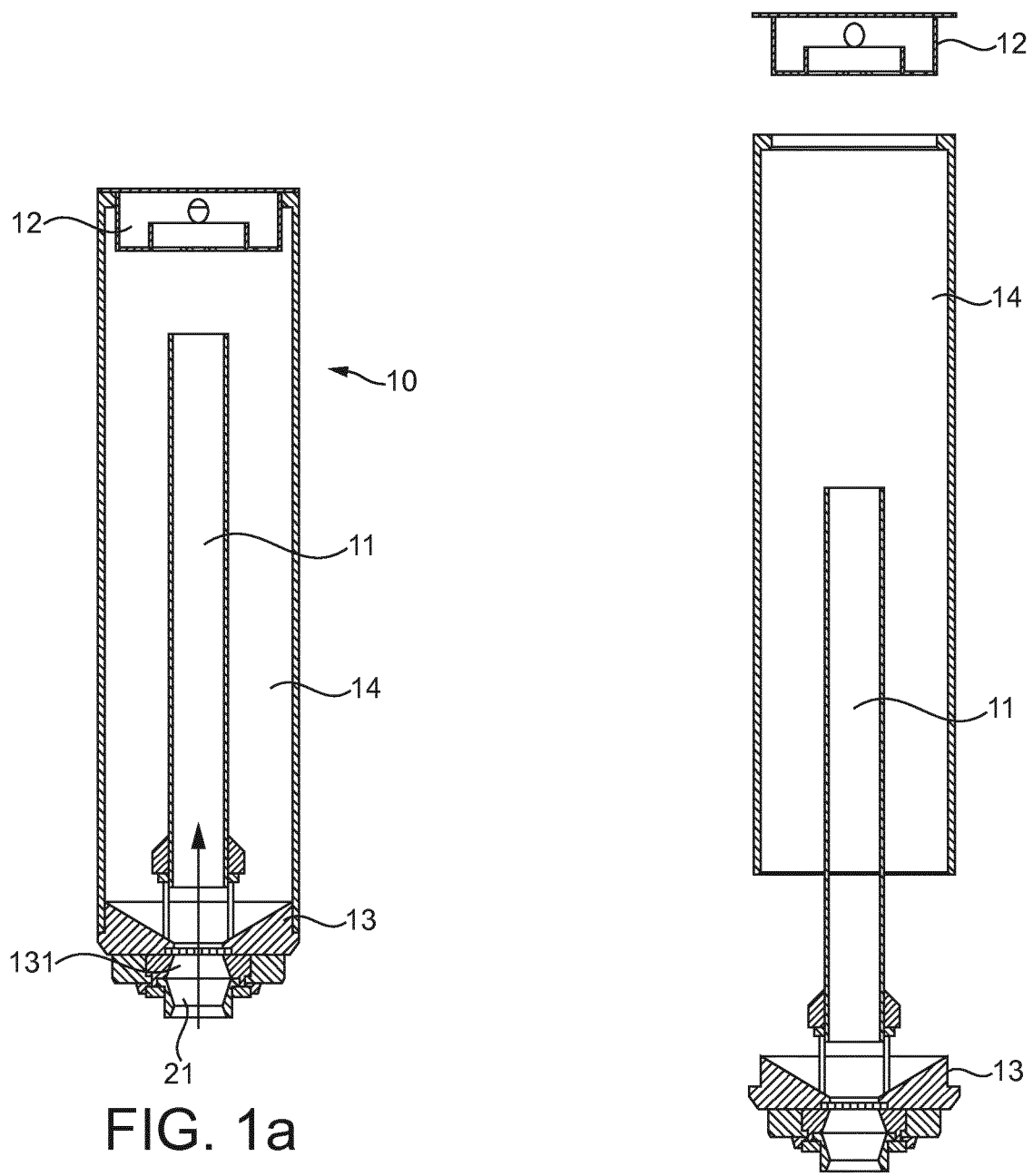
FIGS. 1a-1c show schematic views of a coffee container used to store coffee beans and later to roast and grind them, according to the present invention.
Figure 1C:
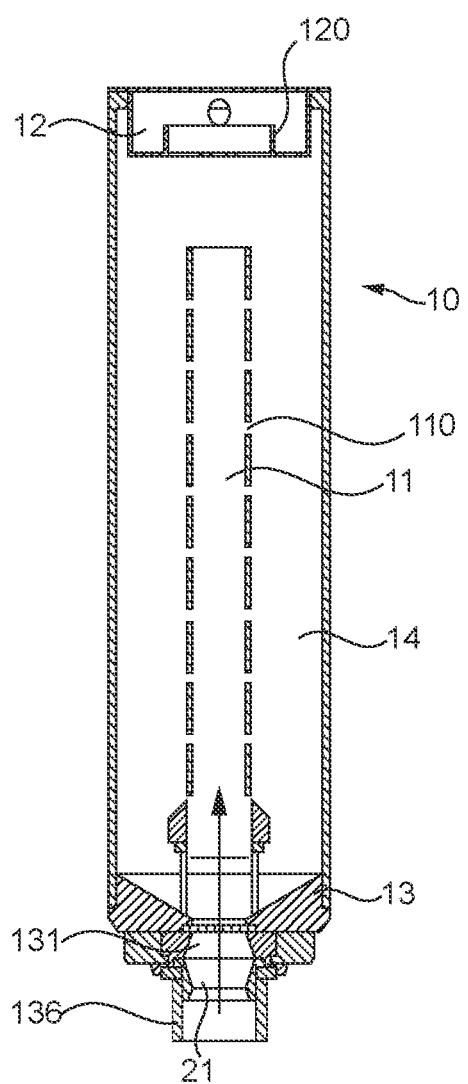

According to a first aspect, the invention relates to a coffee bean container 10 allowing preservation and storage, roasting and grinding of the coffee beans. As shown in FIGS. 1a and 1b, the container 10 is typically configured shaped as a cylinder, having an inner volume 14 where coffee beans are stored: either green coffee beans can be stored in it, or partially roasted beans can also be stored. When beans already roasted at least partially are comprised in the container 10, only partial energy will be needed in the roasting process in the container to get them completely roasted, so time is saved while freshness and aromas are still preserved. The container 10 comprises a roasting tube 11 typically arranged in the middle of the inner volume 14: typically, the tube 11 is hollow and is preferably made in metallic material. It allows internal circulation of air and the creation of a fountain effect, such that air and coffee beans circulate inside the tube 11 and outside of it, in the inner volume 14, to be properly and homogeneously roasted. The tube 11 is preferably configured as a long cylindrical tube able to create this air fountain effect. The roasting tube 11 can also be provided with a plurality of holes 110 through which hot air is further distributed into the inner volume 14. Typically, as the beans expand when they roast, the inner volume of the container is preferably twice the volume of the initial coffee beans inside. This allows approximately 70% of expansion of the coffee beans when they expand plus some additional space enabling continuous movement and circulation of hot air coming from the tube 11 inside the inner volume 14 during the roasting process.

After roasting, cooling of the roasted beans takes place, typically by blowing ambient air or an inert gas such as $N_2$ through the same tube 11 and into the inner volume 14. In a more general way, an ambient or refrigerating cooling media will be introduced in the cartridge after roasting to cool down the roasted beans. Also, water can be sprayed for example, to obtain the same cooling effect of the roasted beans.

The container 10 of the invention further comprises a lid 12 comprising an integrated filter 120 enabling the air circulation inside its volume and releasing humidity during roasting. The filter 120 will also prevent any external particles contaminating the inner volume of the container.

The container 10 further comprises a base 13 to which the roasting tube 11 is attached. The base 13 is provided with a sloped area 130 for feeding the beans and typically also comprises part of the grinder, preferably the female grinding means 131, attached to the other part of the grinding means (male grinding means 21) in a machine or device, as it will be further explained. However, it is also possible that the whole grinder (comprising both male and female parts) is comprised in the container. For the sake of clarity, the reference 21 shown in the Figures shows that the male grinding means are inside this part (they are not completely shown in the Figure, but should be understood that they are inside).

Figure 2:
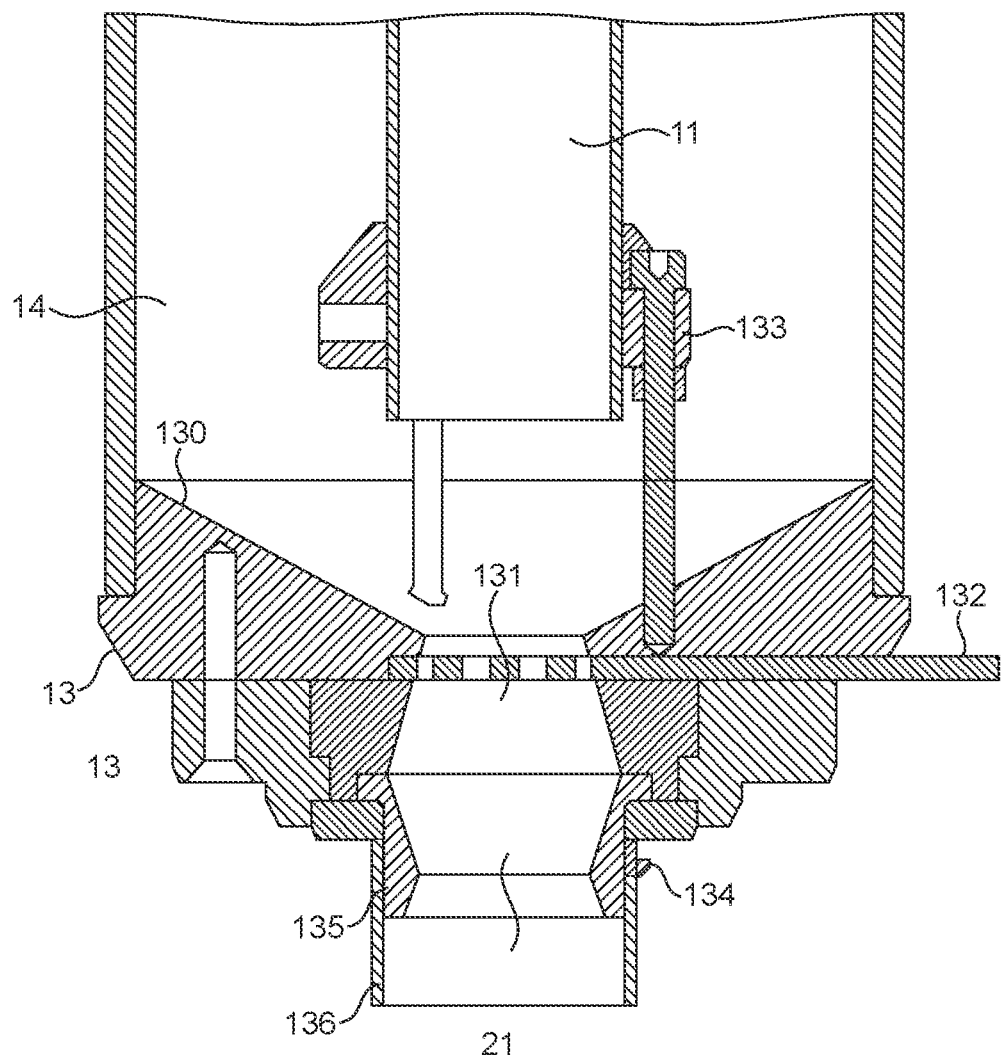
FIG. 2 shows a further detail of a coffee container in FIG. 1a or 1b, according to the present invention.

As shown in more detail in FIG. 2, the roasting tube 11 is separated from the lower part of the base by means of adjustable screws 133 allowing evaluation of the bean size at the entrance of the tube 11 by means of the free space left towards the lower part of the roasting tube 11. In this way, the sloped area 130 is separated from the entrance to the roasting means by adjustable means (typically, screws 133) defining the flow of beans into the roasting means. The base 13 is also typically provided with a removable grill 132: this grill is removed once the roasting process has ended, therefore allowing the beans to fall into the grinder. The base 13 also comprises an interface 135 for connecting to a corresponding operating machine or device 20. The interface and/or the base can be provided with docking guides 134 designed to attach corresponding matching guides in the device 20 to obtain proper connection of the container 10 to the device 20. The invention therefore further relates to a system 100, this system comprising at least one container 10 connected to at least one device 20.

In general, a device 20 in a system 100 of the invention, to which containers 10 will be connected, comprises air means 136 delivering hot and pressurized air into the container in order to allow hot air and beans circulation inside the container for a proper and uniform roasting. The device 20 will also comprise part of the grinding means (typically, the male grinding means 21, connecting to the female grinding means 131 in the container) and a motor configured to drive the assembly of the grinding means in order to grind the roasted coffee beans into ground coffee of a certain a certain size grinded coffee. Different configurations of the device are also possible: for example, roasting and grinding functions can be separated in either different modules of a same device or in different separated devices. The device will typically be further provided with a reader 137 to retrieve information from the identification means in the cartridge comprising cartridge and process information. Moreover, the device can optionally be further provided with means for removing a grill 132 giving access of the roasted coffee beans to the grinder. The device will typically be further provided with means to inject air at ambient temperature or either to inject an inert gas in order to cool the beans after roasting.

To achieve roasting of the coffee beans, hot air at pressure providing a fountain effect is used: typically, air temperature is up to approximately 240° C. and air pressure is above 1 bar to move the beans and obtain an even roasting. Because of the temperature and the pressure that the container has to withstand, typically it is made of glass, the roasting tube 11 being made of metal.

Figure 3:
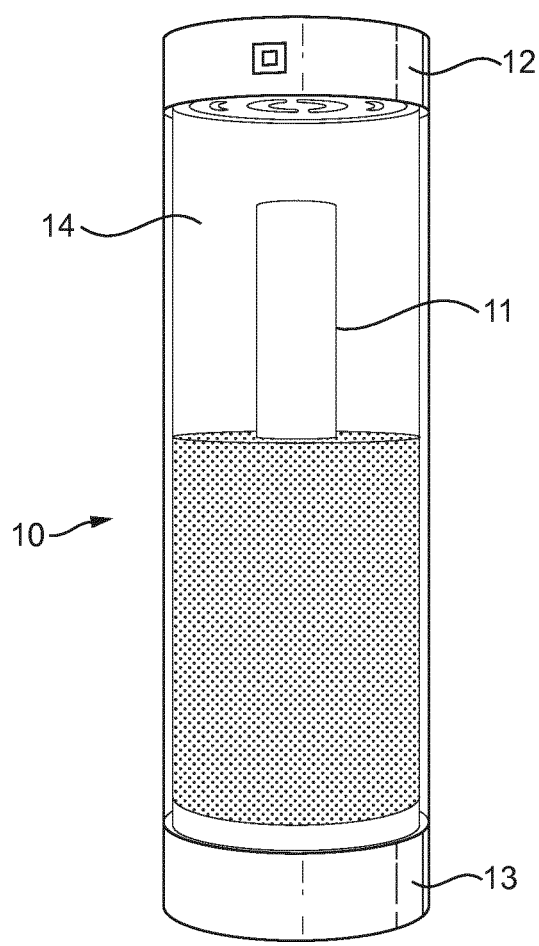
FIG. 3 shows a schematic view of a coffee container as shown in FIG. 1a or 1 b, according to the present invention.
Figure 4A:
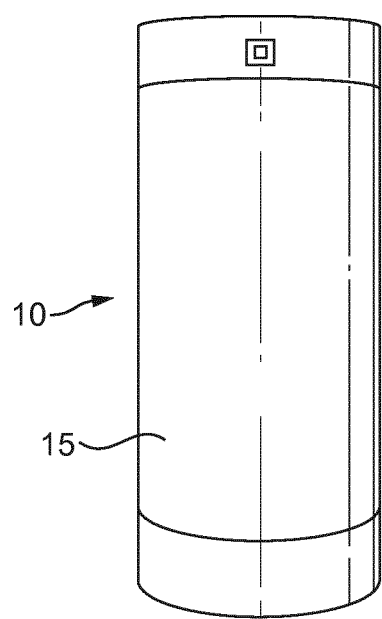
FIGS. 4a-b show a coffee container according to the present invention, comprising an external envelope covering it.
Figure 4B:
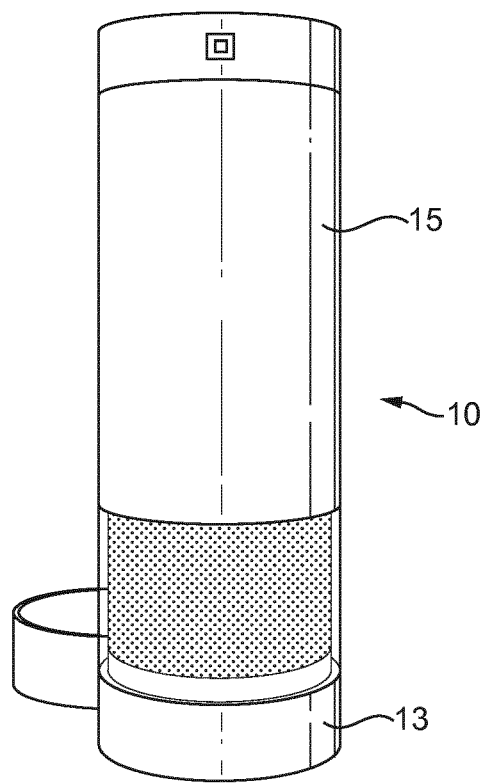

Possible configurations of the container 10 of the invention are possible, such as a cylindrical tube, as shown in FIG. 3 for example. The container can be made in glass, transparent for example, to allow viewing the beans and even the roasting process and the fountain effect. Another possible configuration is shown for example in FIGS. 4a and 4b, where the same container in FIG. 3 is externally covered by a cylindrical external envelope 15, preferably made in carton board, used as secondary packaging and preserving and protecting the container inside (UV protection and protection against possible shocks). This external envelope 15 will be removed when the container is used in the machine and can comprise, for example, outer information on the product contained inside, such as for example type of coffee blend, storage date etc.

Different configurations of the operating device 20 are also possible, further configured to work with different configurations of the container 10, as shown in FIGS. 5-10, as it will further explained in more detail in what follows.

Figure 5:
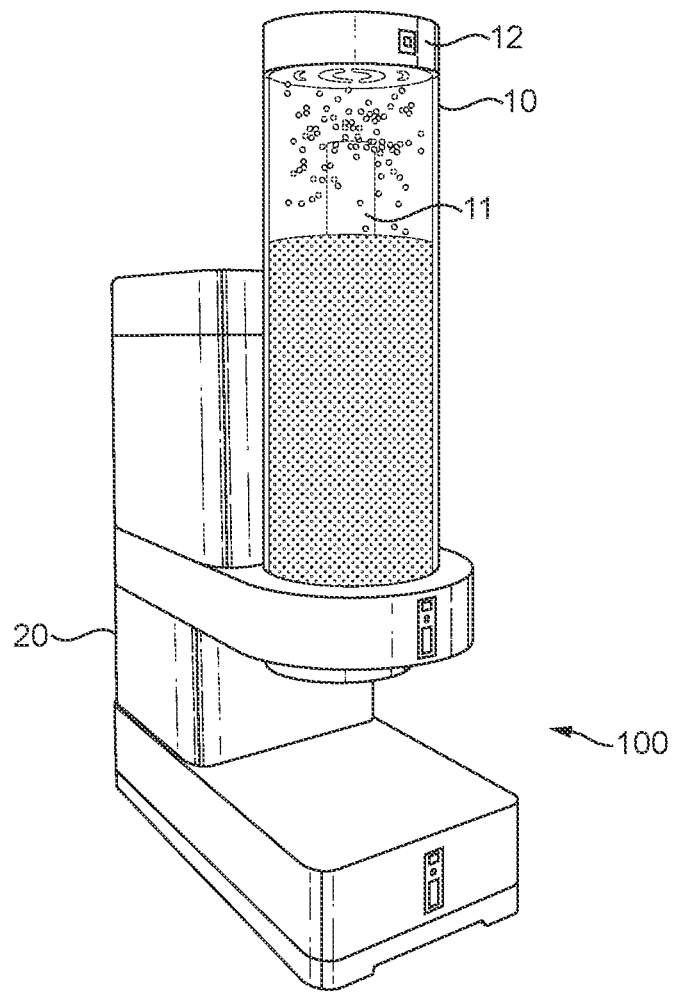
FIG. 5 shows a system for preparing roast and ground coffee according to a first embodiment of the present invention.

For example, FIG. 5 shows a possible all-in-one configuration where the container 10 is configured to have the functions of beans preservation, roasting and partly grinding integrated. The user can take the container and plug it in a corresponding operating device 20. Typically, the container further comprises identification means with information on the type of coffee blend inside of it: when the container is plugged in the device, a reader retrieved the information from these identification means so that roasting parameters and optionally grinding parameters (grinding size) are applied for that type of coffee blend. Even when the grinding size can be automatically stablished by the identification means in the container, it will preferably be set by the consumer by acting on a corresponding control in the device 20 allowing establishment of the grinding size.

Figure 6:
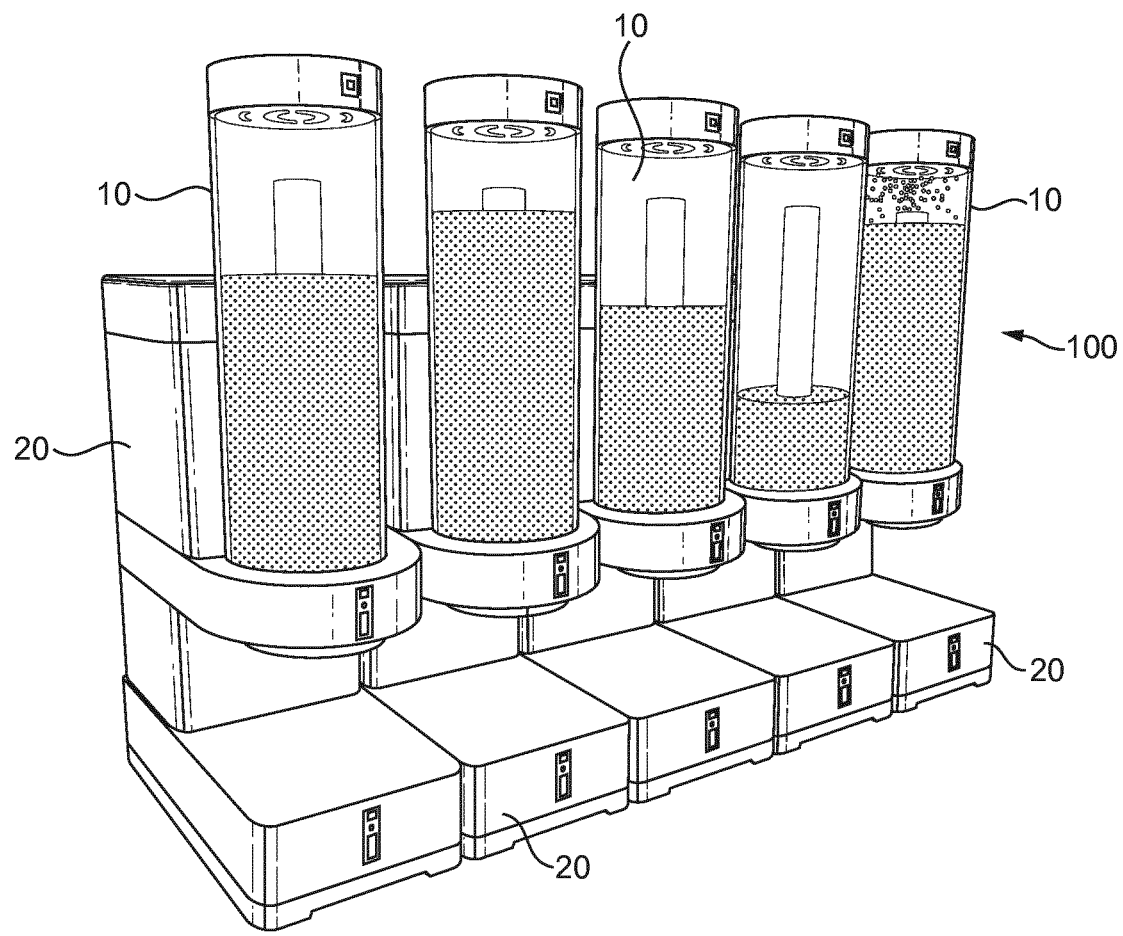
FIG. 6 shows a modular system comprising several systems as in FIG. 5 joined together, according to a first embodiment of the present invention.

In large scale applications, several modules of the configuration shown in FIG. 5 can be attached together, as represented in FIG. 6: typically, each module will be intended for a certain type of coffee blend, so quickly and on-demand roast and ground coffee of different types can be obtained. This FIG. 6 thus shows a complete modular configuration of a system 100. A configuration as shown in FIG. 6 will advantageously used in B2B applications, while a system configuration as shown in FIG. 5 will be adapted for use at home.

Figure 7:
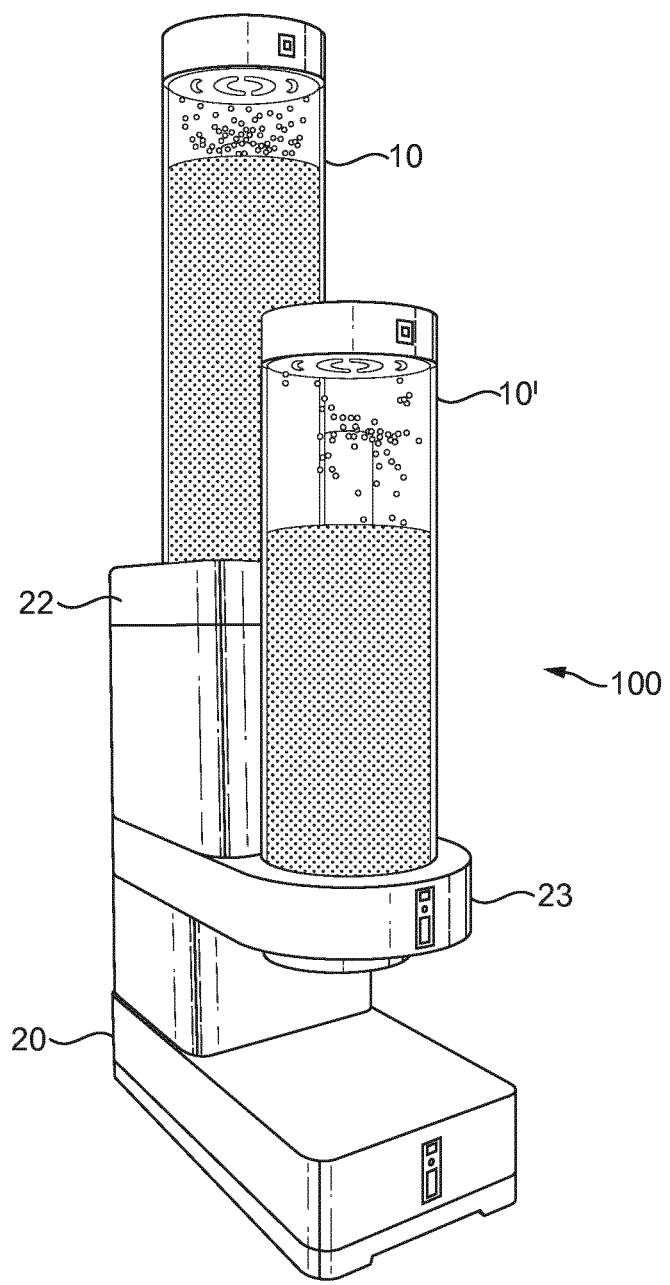
FIG. 7 shows a system for preparing roast and ground coffee according to a second embodiment of the present invention.

Another possible configuration of the invention can be the one shown in FIG. 7, where the roasting and grinding functions are separated though still integrated into one device 20. This configuration allows the user to roast a new cartridge while using an already roasted container for preparing coffee beverages. The device 20 has the possibility of receiving two containers: the device will be provided with a roasting station 22 and a grinding station 23, separated. A typical usage would be to have one device 20 per coffee blend. However, it will be no problem to mix the blends between the roasting station 22 and the grinding station 23 as there would be no contamination. Typically, in this configuration shown in FIG. 7, there are two containers, 10 and 10', connected to the roasting station 22 and to the grinding station 23, respectively. The first container 10 is typically used for roasting and for storage, while the second container 10' is used for grinding and for storage. However, the containers 10 and 10' will be configured in the same way, i.e. having integrated the functions of storage, roasting and grinding: a first cartridge 10 will be used for the storage and the roasting connected to the roasting station 22 and then, transferred named as 10' into the grinding station 23, to proceed with the grinding process.

Figure 8:
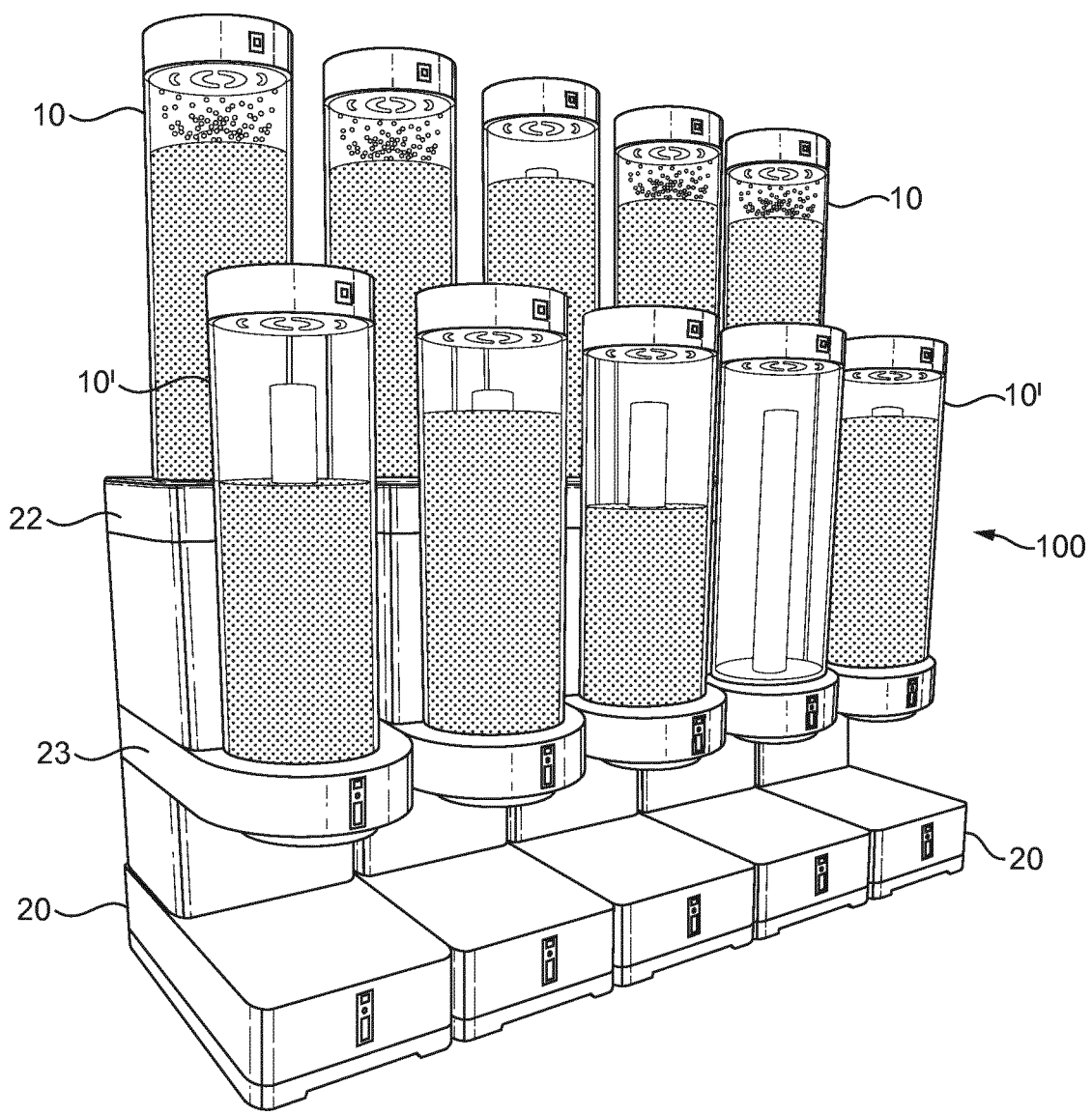
FIG. 8 shows a modular system comprising several systems as in FIG. 7 joined together, according to a second embodiment of the present invention.

Several of these devices as shown in FIG. 7 can be put together in a modular complete configuration, as represented in FIG. 8: usually, the most common configuration would have to have each module prepared for a certain type of coffee blend. This configuration will typically be used in B2B applications, while the one in FIG. 7 will be more suitable for home applications.

Figure 9:
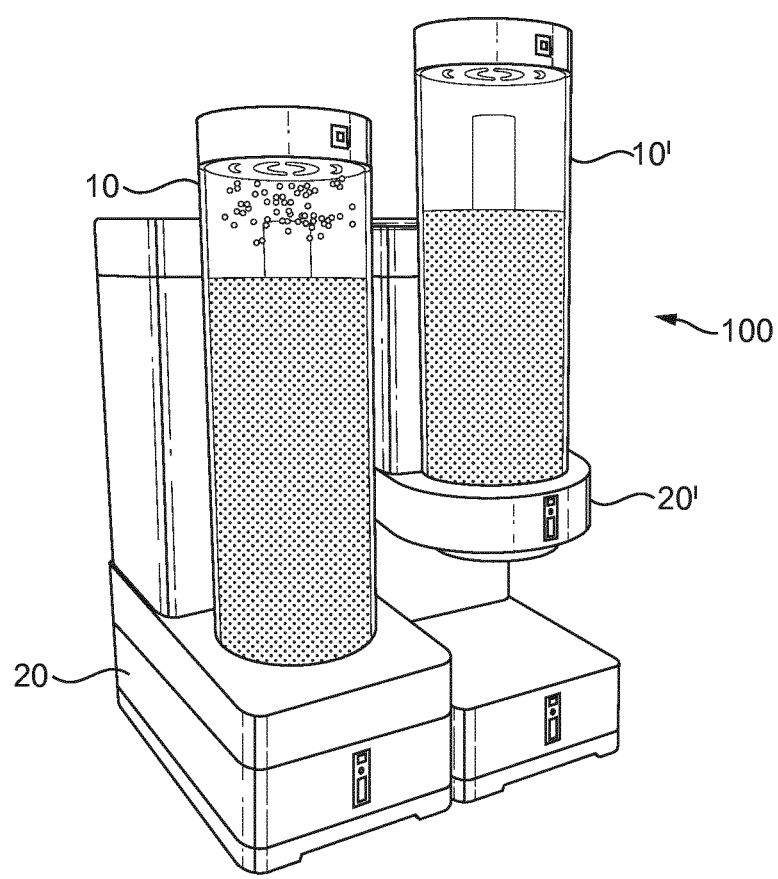
FIG. 9 shows a system for preparing roast and ground coffee according to a third embodiment of the present invention.
Figure 10:
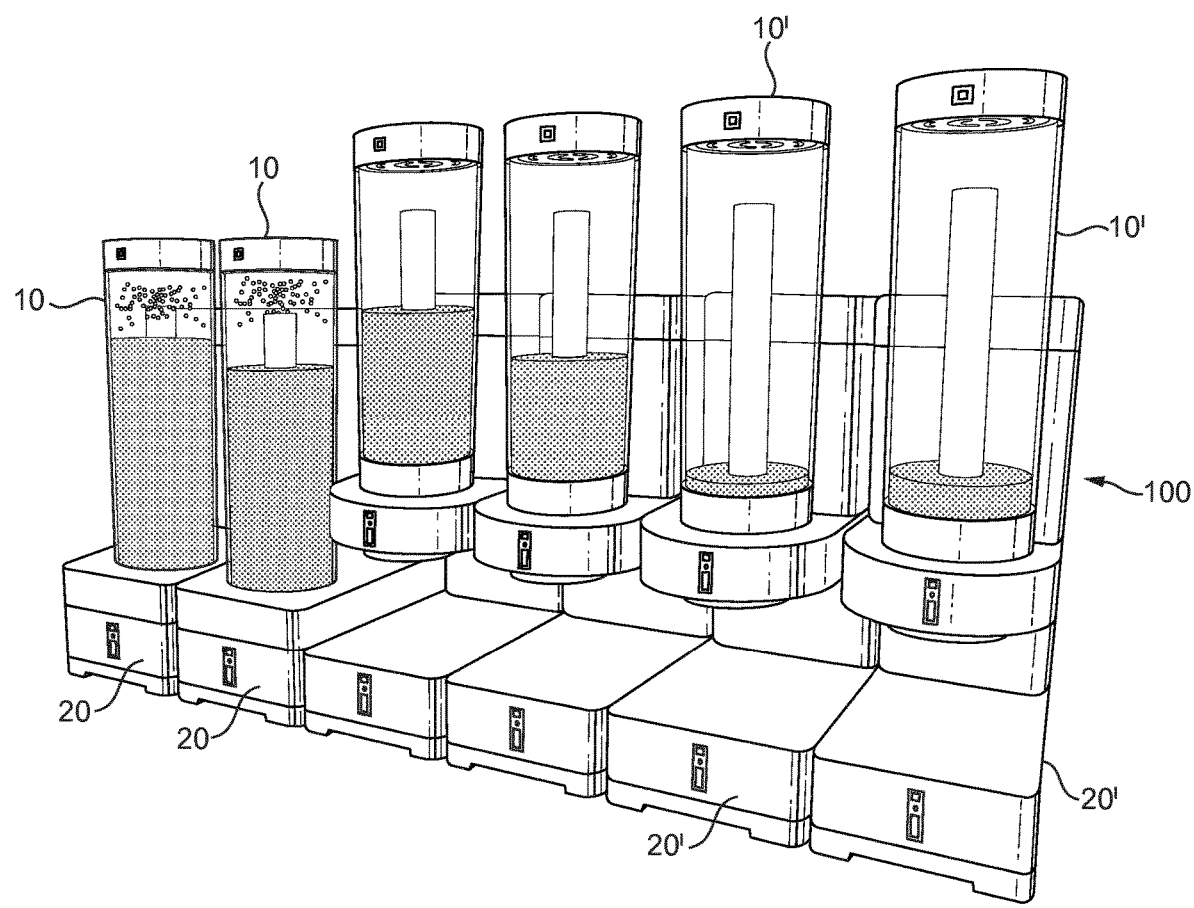
FIG. 10 shows a modular system comprising several systems as in FIG. 9 joined together, according to a third embodiment of the present invention.

Yet another possible configuration of the system 100 of the invention can be found in FIG. 9, where a roasting device 20 is provided, attached to a corresponding roasting and storage container 10, and a separated grinding device 20' is also provided, attached to a corresponding grinding and storage container 10'. With this configuration, the two functions of roasting and grinding are separated. The system 100 can therefore be configured having different number of roasting and/or of grinding stations, which do not have to be the same in number, in order to adapt the system to the processing required: this is for example represented in the modular configuration of FIG. 10, typically used for B2B applications. Also, the containers are configured in the same way, meaning that they integrate the functions of storage, roasting and grinding: when such a container is connected to the roasting device 20, coffee beans are roasted; similarly, when such a container (or another one previously roasted) is connected to the grinding device 20', roasted coffee is now grinded.

The typical configuration for a container according to the invention is of approximately 1 kilo of coffee beans. The connection of the container to the device is previewed in an easy and quick manner, typically by bayonet, press fit, screw or the like. Depending on the type of coffee prepared (espresso takes less coffee quantity than filter-based coffee type) 1 kilo container will allow preparation of 80 to 160 cups of coffee, for example.

Roasting of coffee beans in the container of the invention occurs by hot air having a high level of movement, which is an effective way of transmitting heat to the coffee beans: as air is used to provide movement for the beans during the roasting process, this helps to ensure an even roasting. Also, the inner holes 110 in the tube 11 help to distribute more evenly the air stream in the inner volume of the container. Preferably, a vortex movement of the beans and of the air will be pursued, though a helix or helicoidal movement is also advantageous. Preferably, the movement of the air inside the container is enough to provide a proper roasting of the beans: however, a mechanical device could be added to improve the movement of the container, such as for example making the container rotate with hot air so that a very efficient roasting is achieved in the coffee beans. The mechanical device (not shown in the Figures) can be a shaking or vibrating device, blades, etc.

According to the invention, roasting takes place with air at a temperature comprised between 180° and 240° C. Once roasting has ended, cooling with ambient air or with inner gas such as $N_2$ is done. Roasting needs typically between 15 and 25 minutes (Maillard reaction and reduction of chlorogenic acid needs certain time). Immediately after roasting, cooling to ambient temperature takes place, stopping the roasting process, and during approximately 2 to 4 minutes. Typically, the best flavor after roasting needs from 12 hours till 7 days: during this time, the coffee beans lose carbon dioxide: therefore, in order to protect the beans against oxidation, the atmosphere has to be controlled, and is typically made so by inert gas $N_2$ atmosphere.

In the roasting process, departing from green coffee beans, these expand by typically 170-200% their original volume, sometimes even up to 300% their original volume. Besides, in order to have an even and uniform roasting, the beans need space to move so that all their surfaces are exposed to the heat source, further preventing shadowing phenomenon. For these reasons, a roasting volume of between 2 to 3 times greater than the transportation volume is needed.

Due to roasting process temperatures reaching up to 240° C., adequate materials resistant to these levels are needed to configure the containers. In addition, it would be preferable to use recyclable or compostable materials. Some of the preferred materials to use are: metal (aluminum or stainless steel), glass, plastic (Teflon, PET, glass-reinforced high temperature polymers), carton or fabrics or tissues. Current preferences are stainless steel, glass, carton and fabric due to not only the ability to withstand high temperatures, but due to their traditional manufacturing techniques and because they provide good solutions for sustainability issues.

A typical execution of the container of the invention will be having the external container made in glass, typically transparent (this will allow seeing the coffee beans and also seeing them while they are roasted), the inner tube 11 being made in stainless steel: the container will be then covered by an external sleeve typically made in carton, preserving the container from UV light and comprising for example some logo or information on the products inside.

In the system of the invention, once the coffee beans have been roasted and cooled, they are grinded: typically, the device 20 comprises a burr mill to effect such grinding; preferably, the female grinding means 131 are comprised in the container while the male grinding means 21 are comprised in the machine or device 20. Other types of grinding means, such as for example a disc mill or a mill stone, can also be used in the system of the invention. Preferably, the roasting parameters are comprised in the identification means in the container, and the user selects the grinding parameters typically by acting on control means in the device and selecting the desired grinding size. The grind size can also be set according to the type of coffee to be brewed. For example, the grind size will be very fine for an espresso type (typical quantities will be 6-10 g per shot) and will be fine or medium for a filter coffee type (typical quantities will be 10-12 g per cup). For better in-cup results, the coffee should be brewed soon after it has been grinded, in order to further maintain freshness and aromas: for this reason, an advantage of the system of the invention is that it can be tailored to dispense the correct dose with the correct grain size, and the coffee can be first roasted, maintained a certain time, and later be grinded, very close to the brewing time. Further, the exact quantity can be grinded on demand or it can be grinded into a buffer receptacle and then the desired quantity will be dispensed.

The identification means comprise typically the information on the type of coffee in the container so that the correct roasting parameters can be applied. Also, the identification means will preferably comprise the information on the amount of coffee in the container and also on the roasting level of the coffee means, meaning if the beans are green beans or they are partially roasted and, if so, to what level. The identification means can also comprise preferred grinding values for example for the preferred grinding size, to be provided to the consumer as optional preferred reference values.

Typically, the grinding size is defined in the system of the invention by the offset defined in the grinding means, between the male and the female grinding means. This offset can be set directly by mechanical means acting on one part of the grinding means adjusting the offset in them, preferably according to the grinding size read in the identification means in the container. Also, the offset can be defined directly by the geometrical configuration of the male and female parts of the grinding means.

One of the advantages of the containers of the invention is that they are prepared for storing the coffee beans inside at inert conditions during long storage periods, up to 2 years, under standard ambient conditions (i.e. no high humidity or extreme temperatures). Also, the containers comprise UV protection for a better and longer storage. The containers are maintained in a controlled inert inner atmosphere protecting the content from oxidation. The packaging in the container is done using an overpressure valve.

Some of the advantages of the cartridges and the system of the invention are:
freshness: coffee beans are prepared as close to usage as possible (roasted and/or grinded) and stored under inert conditions to maintain integrity of flavor;
flexibility: options for the desired roast and grind can be provided, allowing choosing parameters according to preferred brewing methods and techniques;
compactness;
excellent UV and shock protection;
less weight and less complexity compared to already existing solutions;
the system can be built-up using modularity;
cartridges with different blends can be used;
on-demand roast and ground coffee can be provided with yet simple and compact system.

According to another aspect, the invention further relates to a method for operating the cartridges and the system described, in order to prepare roast and ground coffee on demand. Typically, the method comprises:
in the execution of FIG. 5, a container 10 comprising a certain blend of coffee beans is connected to a device 20: the device auromatically reads the information on identification meas, determines the roasting parameters (also retrieves information on the roasting level, if any already in the coffee beans) and, when the user orders roasting, applies these to roast the coffee beans by applying moving hot air inside the volume 14 introduced through the tube 11 (possibly also through holes 110 arranged in it), later applying an ambient or refrigerating cooling media to cool the beans and stop the roasting process; the roasted beans are stored in the container 10 until the user wishes ground coffee to brew; then, the user selects typically the grinding size in the device 20 (though also pre-set grinding size parameters can be provided depending on the information from the blend), the removable grill 132 is (either automatically or is the user doing so) removed so that roasted beans go into the grinder and prepared roast and ground coffee can be delivered;
the execution of FIG. 7 works similarly to the one in FIG. 5, with the difference that the user can already roast a new cartridge 10 while using an already roasted cartridge 10' for preparing coffees;
the execution of FIG. 9 works in the same way as the one in Figure in FIG. 7, with the exception that the two functions od roasting and grinding are separated in two devices, 20 and 20': typically, a cartridge already roasted 10' can be plugged into the grinding device 20', while another cartridge 10 will be plugged in the roasting device 20; modular configuration of the system will allow versatile roasting and/or grinding cartridge management.

Although the present invention has been described with reference to preferred embodiments thereof, many modifications and alterations may be made by a person having ordinary skill in the art without departing from the scope of this invention which is defined by the appended claims.

The invention claimed is:

1. A coffee bean container system comprising green and/or partially roasted coffee beans, the coffee bean container system comprising:
 a body having a cylinder shape, the body including an inner volume where the green and/or partially roasted coffee beans are stored;
 a roaster configured for allowing the green and/or partially roasted coffee beans to roast to a certain required degree depending on an original roasting level of the green and/or partially roasted coffee beans; and
 at least one part of a grinder configured for connecting with a corresponding part of the grinder, the connected at least one part and the corresponding part of the grinder together configured for grinding the green and/or partially roasted coffee beans, once roasted, to a certain grinding size;
 wherein the roaster comprises a roasting hollow tube through which pressurized hot air is introduced, the pressurized hot air being configured to cause the green and/or partially roasted coffee beans to circulate inside the roasting hollow tube and into the inner volume of the coffee bean container system, creating a fountain effect.

2. The coffee bean container according to claim 1 wherein the roasting hollow tube comprises holes through which the hot air goes into the inner volume of the coffee bean container system.

3. The coffee bean container system according to claim 1, wherein the green and/or partially roasted coffee beans stored in the inner volume occupies an initial volume, and wherein the inner volume of the body is at least two times the initial volume of the green and/or partially roasted coffee beans.

4. The coffee bean container system according to claim 1 wherein an ambient or refrigerating cooling media is introduced through a roasting hollow tube of the roaster to cool down the green and/or partially roasted beans.

5. The coffee bean container system according to claim 1 further comprising a lid closing an upper part of the coffee bean container system, the lid provided with a filter.

6. The coffee bean container system according to claim 1, wherein the body includes a sloped area below an entrance to the roaster, wherein a spacing between the sloped area and the entrance to the roaster is configured to be adjusted by an adjustable member, and wherein adjusting the spacing defines a flow of the green and/or partially roasted coffee beans into the roaster.

7. The coffee bean container system according to claim 1 further comprising a grill configured to be removed to allow the green and/or partially roasted coffee beans to enter the at least one part of the grinder.

8. The coffee bean container system according to claim 1, wherein the coffee bean container is made from a material selected from the group consisting of metal, plastic, carton fabric, and tissue.

9. The coffee bean container system according to claim 8 further comprising an external envelope configured for preserving and protecting the coffee bean container system from UV light and shocks.

10. The coffee bean container system according to claim 1 further comprising an identification member with information on a type, a quantity, a roasting process, a roasting level, and/or a preferred grinding size of the green and/or partially roasted coffee beans.

11. The coffee bean container system according to claim 1, further comprising the corresponding part of the grinder.

12. The coffee bean container system according to claim 1, wherein a device configured to receive the coffee bean container system comprises the corresponding part of the grinder, the corresponding part of the grinder configured to connect to the at least one part of the grinder of the coffee bean container system.

13. A device operating with a coffee bean container system comprising green and/or partially roasted coffee beans, the coffee bean container system comprising a body having a cylinder shape, the body including an inner volume configured for storing the green and/or partially roasted coffee beans; a roaster configured for allowing the green and/or partially roasted coffee beans to roast to a certain required degree depending on an original roasting level of the green and/or partially roasted coffee beans; and at least part of a grinder configured for connecting with a corresponding part of the grinder, the connected at least one part and the corresponding part of the grinder together configured for grinding the green and/or partially roasted coffee beans, once roasted, to a certain grinding size,
  wherein the roaster comprises a roasting hollow tube through which pressurized hot air is introduced, the pressurized hot air being configured to cause the green and/or partially roasted coffee beans to circulate inside the roasting hollow tube and into the inner volume of the coffee bean container system, creating a fountain effect, the device further comprising:
  an air injector configured for injecting air at temperature comprised between 180° C. and 240° C. at a pressure of about 1 bar.

14. The device according to claim 13 wherein roasting and grinding parameters are provided by an identification member on the coffee bean container system.

15. The device according to claim 13 wherein the air is injected in the inner volume of the coffee bean container system with a vortex, spiral, and/or helicoidal movement.

16. The device according to claim 13 further comprising a mechanical member configured for providing movement to the coffee bean container so that the air and the green and/or partially roasted coffee beans are uniformly roasted.

17. The device according to claim 13 further comprising a member configured for injecting an ambient or refrigerating cooling media inside the inner volume of the coffee bean container system after roasting of the green and/or partially roasted coffee beans.

18. The device according to claim 13 further comprising a motor to actuate the at least one part of the grinder.

19. The device according to claim 13 further comprising a reader to read information on an identification member on coffee bean container system to apply roasting and/or grinding parameters.

20. The device according to claim 13, wherein the coffee bean container system comprises the corresponding part of the grinder.

21. The device according to claim 13 further comprising the corresponding part of the grinder.

22. A method for preparing roast and ground coffee on-demand departing from coffee beans in a coffee bean container system, the method comprising the following steps:
  providing the coffee bean container system comprising:
    a body having a cylinder shape, the body including an inner volume where the green and/or partially roasted coffee beans are stored;
    a roaster configured for allowing the green and/or partially roasted coffee beans to roast to a certain required degree depending on an original roasting level of the green and/or partially roasted coffee beans; and
    at least one part of a grinder configured for connecting with a corresponding part of the grinder and the connected at least one part and the corresponding part of the grinder together grinding the green and/or partially roasted coffee beans, once roasted, to a certain grinding size;
    wherein the roaster comprises a roasting hollow tube through which pressurized hot air is introduced, the pressurized hot air being configured to cause the green and/or partially roasted coffee beans to circulate inside the roasting hollow tube and into the inner volume of the coffee bean container system, creating a fountain effect:
  connecting the coffee bean container system to a preparation device;
  injecting pressurized hot air into the volume of the coffee bean container system, causing the coffee beans to circulate inside of the volume of the coffee bean container system for a homogeneous roasting according to roasting parameters read from an identification member on the coffee bean container system;
  after roasting, injecting ambient or refrigerating cooling media in the volume of the coffee bean container system to cool the coffee beans;
  after the coffee beans are cooled down, opening communication to the connected at least one part and the corresponding part of the grinder;
  setting the connected at least one part and the corresponding part of the grinder to a specific grinding size read from the identification member on the coffee bean container system; and
  activating the connected at least one part and the corresponding part of the grinder on demand to deliver the roast and ground coffee.

23. The method according to claim 22 wherein the specific grinding size is defined by a mechanical member adjusting a distance between the at least one part and the corresponding part of the grinder or is defined by an offset between the at least one part and the corresponding part of the grinder.

24. The method according to claim 22, wherein the coffee bean container system comprises the corresponding part of the grinder.

25. The method according to claim 22, wherein the preparation device comprises the corresponding part of the grinder.

* * * * *

UNITED STATES PATENT AND TRADEMARK OFFICE
CERTIFICATE OF CORRECTION

| | | |
|---|---|---|
| PATENT NO. | : 11,523,710 B2 | Page 1 of 1 |
| APPLICATION NO. | : 16/339450 | |
| DATED | : December 13, 2022 | |
| INVENTOR(S) | : Flavien Dubief et al. | |

It is certified that error appears in the above-identified patent and that said Letters Patent is hereby corrected as shown below:

On the Title Page

Please change the applicant name from "NESTEC S.A." to "SOCIÉTÉ DES PRODUITS NESTLÉ S.A."

Signed and Sealed this
Eighth Day of August, 2023

Katherine Kelly Vidal
*Director of the United States Patent and Trademark Office*